United States Patent [19]

Plichta et al.

[11] Patent Number: 5,300,376
[45] Date of Patent: Apr. 5, 1994

[54] HIGHLY CONDUCTIVE ELECTROLYTE FOR USE IN AN AMBIENT TEMPERATURE RECHARGEABLE LITHIUM BATTERY AND AMBIENT TEMPERATURE RECHARGEABLE LITHIUM BATTERY INCLUDING SAID ELECTROLYTE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 945,039

[22] Filed: Sep. 15, 1992

[51] Int. Cl.$^5$ ............................................. H01M 4/52
[52] U.S. Cl. .................................. 429/197; 429/192; 429/194; 429/218
[58] Field of Search ..................... 429/192, 194, 197

[56] References Cited

U.S. PATENT DOCUMENTS

| | | | |
|---|---|---|---|
| 4,882,244 | 11/1989 | Donahue et al. | 429/194 |
| 5,017,444 | 5/1991 | Nakajima et al. | 429/194 |
| 5,084,366 | 1/1992 | Toyoguchi et al. | 429/194 |
| 5,102,751 | 4/1992 | Harang et al. | 429/192 |

FOREIGN PATENT DOCUMENTS

| | | | |
|---|---|---|---|
| 0213557 | 9/1984 | Fed. Rep. of Germany | 429/194 |
| 0125443 | 9/1979 | Japan | 429/194 |
| 3-296556 | 12/1991 | Japan | 429/192 |

*Primary Examiner*—David B. Springer
*Attorney, Agent, or Firm*—Michael Zelenka; Roy E. Gordon

[57] ABSTRACT

A highly conductive electrolyte is provided for use in an ambient temperature rechargeable lithium battery including a lithium intercalating anode and a more positive lithium intercalating cathode. The electrolyte includes a solution of a lithium salt in acetonitrile.

13 Claims, 1 Drawing Sheet

HIGHLY CONDUCTIVE ELECTROLYTE FOR USE IN AN AMBIENT TEMPERATURE RECHARGEABLE LITHIUM BATTERY AND AMBIENT TEMPERATURE RECHARGEABLE LITHIUM BATTERY INCLUDING SAID ELECTROLYTE

GOVERNMENT INTEREST

The invention described herein may be manufactured, used, and licensed by or for the Government for governmental purposes without the payment to us of any royalty thereon.

FIELD OF INVENTION

This invention relates in general to ambient temperature, rechargeable, lithium batteries and in particular to the use of highly conductive electrolytes for the lithium batteries.

BACKGROUND OF THE INVENTION

The use of organic electrolytes commonly employed in ambient temperature rechargeable lithium batteries has been hampered by the low conductivities of the electrolytes so that the cells can not be recharged at current densities above about 0.3 mA/cm$^2$ be discharged at current densities above about 3 to 10 mA/cm$^2$.

SUMMARY OF THE INVENTION

The general object of this invention is to provide a high conductivity electrolyte for use in an ambient temperature rechargeable lithium battery. A further object of the invention is to provide such an electrolyte for use in an ambient temperature rechargeable lithium battery that uses lithium intercalation compounds such as TiS$_2$, WO$_2$, MoO$_2$ and graphite etc as anodes instead of lithium metal. A still further object of the invention is to provide such a battery wherein both the charge and discharge rates are higher than those obtained with conventional electrolytes used in lithium batteries. Another object of the invention is to provide such a battery that exhibits excellent cycle life.

It has now been found that the aforementioned objects can be attained by providing an electrolyte of 1.5 molar lithium hexafluoroarsenate (LiAsF$_6$) in acetonitrile (AN) for use in a battery that includes lithium intercalation compounds such as TiS$_2$, WO$_2$, MoO$_2$, VSe$_2$, Li$_2$TiS$_2$, Li$_2$Se$_2$, lithiated graphite, lithiated carbon, lithiated petroleum coke etc as anodes and a more voltage positive lithium intercalating cathode such as LiCoO$_2$ or LiNiO$_2$.

In lieu of LiAsF$_6$ as the electrolyte salt one may use other lithium salts that dissolve in acetonitrile such as LiAlCl$_4$, LiClO$_4$, LiBF$_4$, and LiPF$_6$.

As the organic solvent of the electrolyte, it is preferred to use acetonitrile alone, but the invention also contemplates the use of acetonitrile together with other solvents that are not compatible with metallic lithium.

DESCRIPTION OF THE DRAWING AND THE PREFERRED EMBODIMENT

Figure 1:
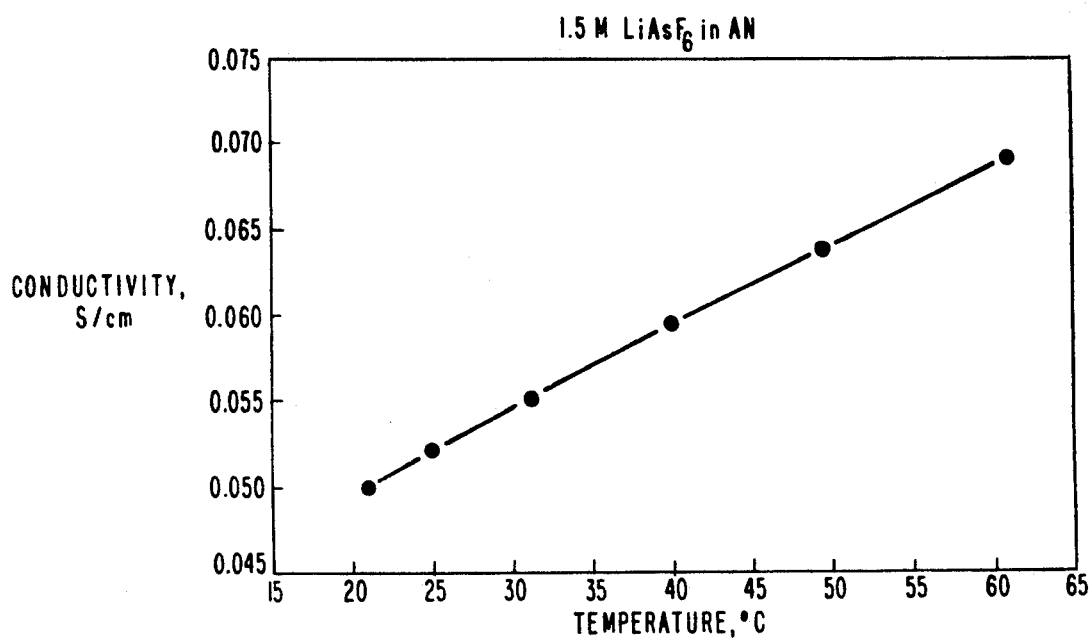
FIG. 1 is the plot of the conductivities of an electrolyte of 1.5 molar LiAsF$_6$ in AN.

The electrolyte of 1.5 molar LiAsF$_6$ in AN has a conductivity of 0.0501 SCm$^{-1}$ at 21° C. and increases to 0.0692 SCm$^{-1}$ at 61° C. The conductivities of this electrolyte is plotted in FIG. 1 as a function of temperature. These conductivity values are higher than the conductivity of organic electrolytes presently used in ambient temperature rechargeable lithium batteries. Unfortunately, this highly conducting electrolyte can not be used in conventional lithium batteries because the lithium anodes react spontaneously with the acetonitrile solvent. The highly conducting electrolyte solutions can, however, be used in cells that use lithium intercalation compounds such as TiS$_2$, WO$_2$, MoO$_2$, VSe$_2$, Li$_2$TiS$_2$, Li$_2$Se$_2$, lithiated graphite, lithiated carbon, or lithiated petroleum coke as the anode instead of lithium metal and a more voltage positive lithium intercalating cathode such as LiCoO$_2$ or LiNiO$_2$. The intercalation anodes are chemically stable in acetonitrile solutions unlike lithium metal and allow the fabrication of ambient temperature rechargeable lithium cells that can be charged and discharged at higher rates than the conventional lithium batteries.

A cell is then made using the highly conducting acetonitrile solutions as electrolyte. The cell corresponds to Li$_x$TiS$_2$/1.5 molar LiAsF$_6$ - AN/Li$_{1-x}$CoO$_2$ where X has a value between 0 and 1.

Figure 2:
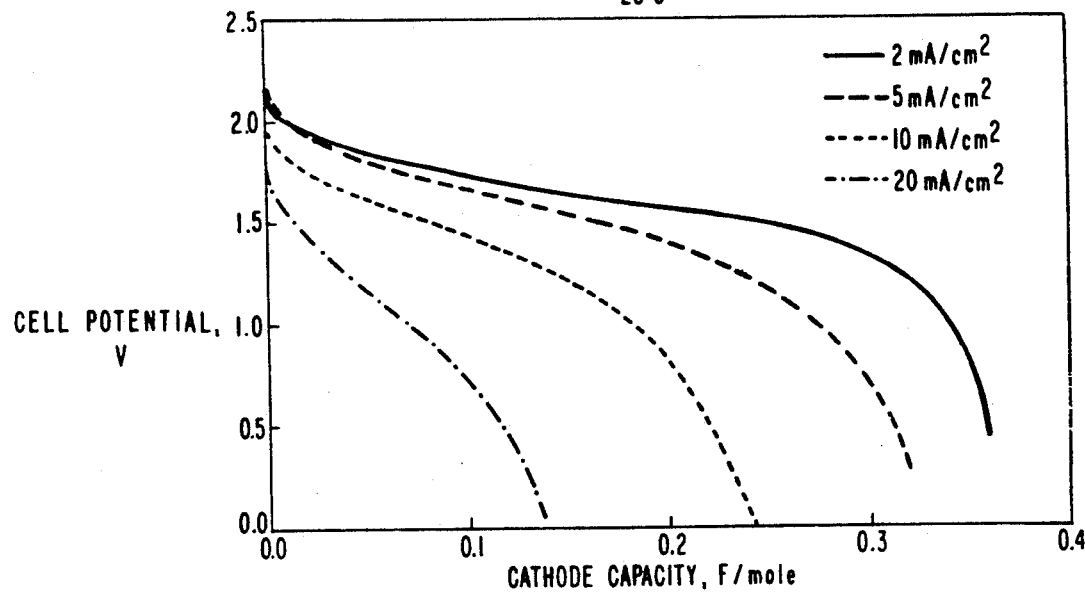
FIG. 2 shows the discharge curves at current densities of 2 to 20 mA/cm$^2$ for the cell Li$_x$TiS$_2$/1.5 M LiAsF$_6$ in AN/Li$_{1-x}$CoO$_2$ where X has a value between 0 and 1.

Thin films of titanium disulfide and lithium cobalt oxide are deposited on an aluminum substrate by chemical vapor deposition and sprayed sol gel techniques, respectively. The cell is fabricated and cycled in a glove box. The cell exhibits an open circuit potential of 2.1 volts and can be discharged at current densities up to 20 mA/cm$^2$. The discharge curves at current densities of 2 to 20 mA/cm$^2$ are shown in FIG. 2. The cell can also be charged at a current density of 2 mA/cm$^2$. Both the charge and discharge rates are higher than those obtained with conventional electrolytes used in lithium batteries. The cell also exhibits excellent cycle life and delivers 300 cycles.

We wish it to be understood that we do not desire to be limited to the exact details of construction shown and described for obvious modifications will occur to a person skilled in the art.

What is claimed is:

1. A highly conductive electrolyte for use in an ambient temperature rechargeable lithium battery including a lithium intercalcating anode selected from the group consisting of TiS$_2$, WO$_2$, MoO$_2$, VSe$_2$, Li$_2$TiS$_2$, Li$_2$VSe$_2$, lithiated graphite, lithiated carbon, and lithiated petroleum coke, and a lithium intercalating cathode selected from the group consisting of LiCoO$_2$ and LiNiO$_2$, said electrolyte having a solution of a lithium salt in acetonitrile, wherein the lithium salt is selected from the group consisting of LiAsF$_2$, LiAlCl$_4$, LiClO$_4$, LiBF$_4$, and LiPF$_6$.

2. A highly conductive electrolyte according to claim 1 wherein the lithium salt is LiAsF$_6$.

3. A highly conductive electrolyte according to claim 1 wherein the lithium salt is LiAlCl$_4$.

4. A highly conductive electrolyte according to claim 1 wherein the electrolyte salt is LiBF$_4$.

5. A highly conductive electrolyte according to claim 1 wherein the electrolyte salt is LiBF$_4$.

6. A highly conductive electrolyte according to claim 1 wherein the electrolyte salt is LiPF$_6$.

7. A highly conductive electrolyte according to claim 2 wherein the electrolyte is a solution of about 1.5 molar $LiAsF_6$ in acetonitrile.

8. An ambient temperature chargeable lithium battery system comprising a lithium intercalating anode selected from the group consisting of $TiS_2$, $WO_2$, $MoO_2$, $VSe_2$, $Li_2TiS_2$, $Li_2VSe_2$, lithiated graphite, lithiated carbon, and lithiated petroleum coke, a lithium intercalating cathode selected from the group consisting of $LiCoO_2$ and $LiNiO_2$ and a solution of a lithium salt in acetonitrile as the electrolyte wherein the lithium salt in the electrolyte solution is selected from the group consisting of $LiAlCl_4$, $LiClO_4$, $LiBF_4$, $LiAsF_6$, and $LiPF_6$.

9. An ambient temperature rechargeable lithium battery system according to claim 8 wherein the lithium intercalating and is $Li_2TiS_2$.

10. An ambient temperature rechargeable lithium battery system according to claim 11 wherein the lithium intercalating cathode is $LiCoO_2$.

11. An ambient temperature rechargeable lithium battery system according to claim 8 wherein the lithium intercalating cathode is $LiNiO_2$.

12. An ambient temperature rechargeable lithium battery system according to claim 8 wherein the lithium salt in the electrolyte solution is $LiAsF_6$.

13. An ambient temperature rechargeable lithium battery system including $TiS_2$ as the anode, $LiCoO_2$ as the cathode, and a solution of about 1.5 molar $LiAsF_6$ in acetonitrile as the electrolyte.

* * * * *